(12) United States Patent  
MacKarvich

(10) Patent No.: US 6,957,826 B1  
(45) Date of Patent: Oct. 25, 2005

(54) PIVOTAL TRAILER HITCH

(76) Inventor: Charles J. MacKarvich, 5901 Wheaton Dr., Atlanta, GA (US) 30336

( * ) Notice: Subject to any disclaimer, the term of this patent is extended or adjusted under 35 U.S.C. 154(b) by 0 days.

(21) Appl. No.: 10/861,075

(22) Filed: Jun. 4, 2004

(51) Int. Cl.[7] ............................................. B60D 1/155
(52) U.S. Cl. ................................................. 280/491.3
(58) Field of Search .......................... 280/491.3, 491.1, 280/493

(56) References Cited

U.S. PATENT DOCUMENTS

| | | | |
|---|---|---|---|
| 4,372,568 A * | 2/1983 | Campbell | 280/63 |
| 4,398,742 A * | 8/1983 | Sanders | 280/491.3 |
| 5,503,423 A | 4/1996 | Roberts et al. | 280/491.3 |
| 5,624,129 A * | 4/1997 | Clark, Jr. | 280/478.1 |
| 6,364,337 B1 * | 4/2002 | Rowland et al. | 280/491.3 |
| 6,595,540 B1 | 7/2003 | MacKarvich | 280/491.3 |
| 2002/0190499 A1 * | 12/2002 | Connor | 280/491.2 |
| 2004/0239073 A1 * | 12/2004 | Goettker | 280/491.1 |

* cited by examiner

Primary Examiner—Kevin Hurley  
(74) Attorney, Agent, or Firm—Thomas, Kayden, Horstemeyer & Risley, LLP

(57) ABSTRACT

A pivotal hitch assembly (14) connection to the draw bar (18) of a trailer includes a hitch housing (22) formed of a hollow tube having a greater breadth than the draw bar. The hitch housing receives the draw bar and is pivotally coupled to the draw bar by aligning two corresponding sets of openings in the hitch housing and the draw bar and inserting a pivot pin (55) through one set of the corresponding aligned openings. The pivotal hitch assembly is placed into the aligned operational or towing position by inserting a removable locking pin (58) into the other set of the corresponding aligned openings. A cuff (64) is positioned between the draw bar and the hitch housing to reduce the frictional contact between the hitch housing and the draw bar. The pivotal hitch assembly is placed in the storage position by removing the locking pin (58) and pivoting the hitch housing (22) around the pivot pin.

14 Claims, 5 Drawing Sheets

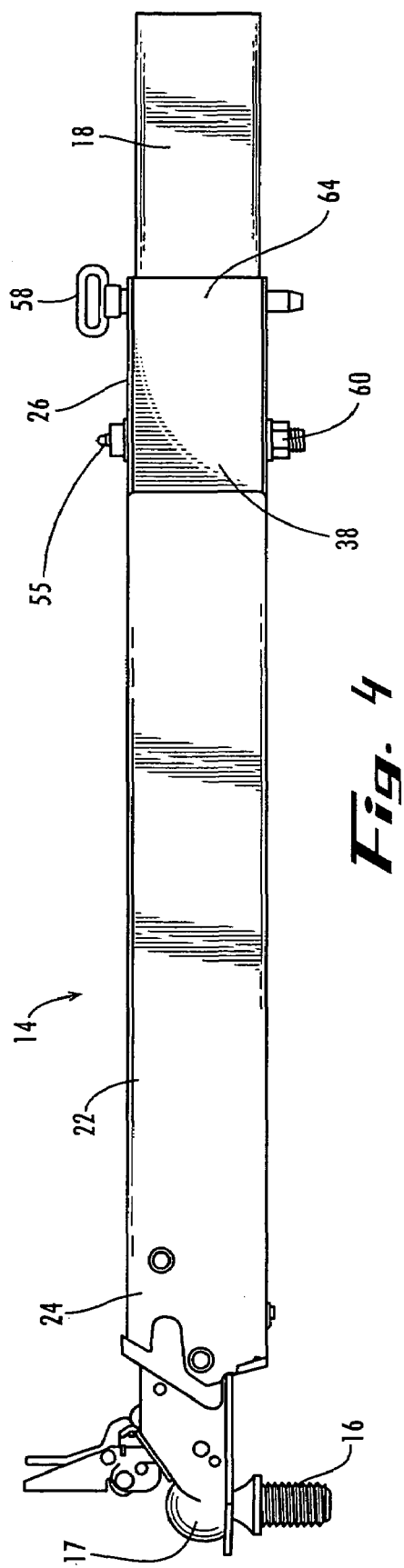
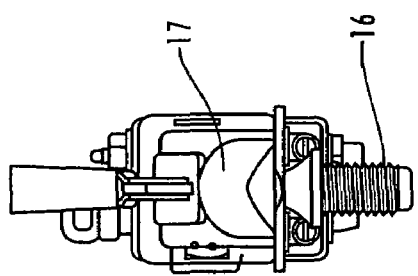
Fig. 4
Fig. 5

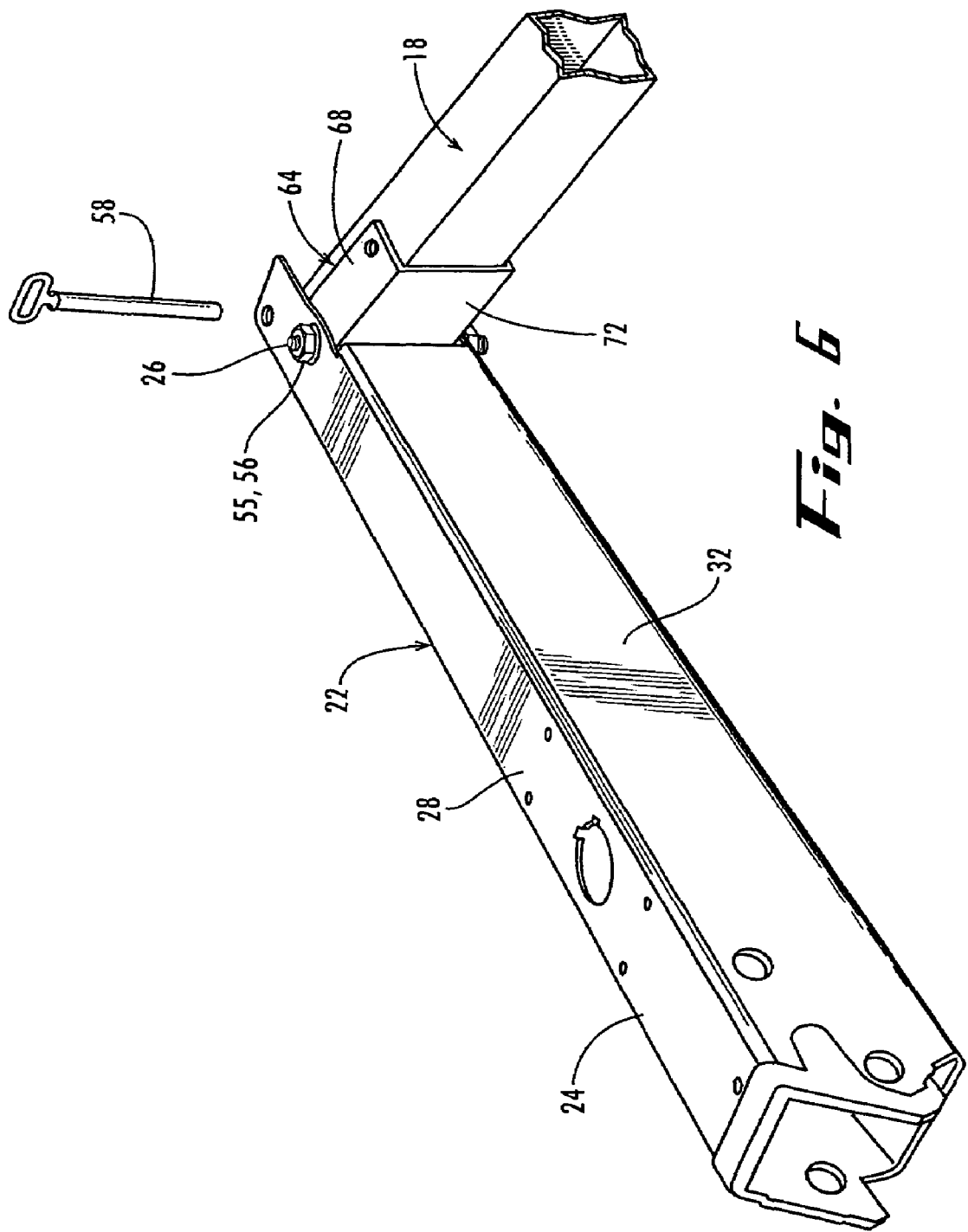

PIVOTAL TRAILER HITCH

FIELD OF INVENTION

The present invention concerns hitch assemblies for trailers and, more particularly, concerns a pivotal hitch assembly that allows the hitch of a trailer to pivot or fold back laterally to a position adjacent the trailer draw bar to shorten the overall length of the trailer when the trailer is not in use.

BACKGROUND

Many trailers, especially boat trailers, are long and have draw bars with hitches at the front of the trailer frame that extend forwardly of the trailer frame, far from the rear end of the trailer or the rear end of the boat carried by the trailer. This has the potential of making the storing of a boat and its trailer difficult and/or expensive when the storage is in a garage that is too short. To store a boat and its trailer in a short garage, the owner of the trailer might be forced to choose between expanding the size of the garage where the trailer is to be stored, or buying a smaller trailer. The size of the trailer is important, especially for boat trailers, where the length of the trailer determines the maximum length of the boat that can be safely towed on the trailer.

One solution to over length trailers is a pivotal towing draw bar. Prior art hitch assemblies having foldable draw bars are taught in U.S. Pat. No. 4,398,742 (Sanders), U.S. Pat. No. 5,503,423 (Roberts et al.) and U.S. Pat. No. 5,890,617 (Rowland et al.).

The Sanders patent discloses a tongue or draw bar of a boat trailer is cut and then the ends are releasably hinged together by a pair of spaced apart, parallel hinge pins, either of which can be withdrawn to permit the forward end of the draw bar to be swung laterally about the remaining pin, to a position beside the rear of the draw bar to an inactive position. This effectively shortens the overall length of the draw bar so that the associated trailer can be readily stored in a conventional garage. The hinge mechanism comprises a pair of tubular members designed to be slid over the cut ends of the draw bar, and then to be bolted and/or welded to the associated draw bar section. Confronting ends of the hinge members have thereon two sets of cooperating hinge barrels, which releasably support the two hinge pins about spaced apart, vertical axis adjacent opposite sides, respectively of the draw bar.

The Roberts et al. patent discloses a tubular hitch sandwiched between top and bottom plates. Holes through the hitch and plates are aligned with one another and the tubular casing is inserted through the holes. Thereafter, the ends of the tubular casings are swaged or expanded by pressing bullet shaped pins into opposite ends of the casing. The swaging effect securely fastens the components. Finally, pins are inserted through the casings to mount the swing away hitch on the trailer.

The Rowland et al. patent discloses a draw bar of a trailer sandwiched between two plates with holes that align with tubular sleeves welded on opposite sides at the end of a hitch cover to convert it to a swing away hitch. Pins are inserted to mount the swing away hitch onto the swing away hitch assembly. In a towing position, both pins stay in their sleeves. In a stow-away position, one pin is removed and the swing away hitch swivels via the remaining pin away to the side of the trailer.

A problem with the prior art foldable trailer draw bar structures is the cost of manufacturing a structurally reliable and strong connector between the foldable parts. The prior art systems include multiple parts that must be aligned, bolted, and/or welded together. The pivotal trailer hitch of Applicant's previous U.S. Pat. No. 6,595,540 addresses this problem by disclosing and claiming embodiments of a pivotal hitch assembly including a hitch that is pivotally coupled to mounting plates that are rigidly attached to a draw bar of a trailer. The hitch includes a pair of connector tubes that receive pins that couple the hitch to the mounting plates. The hitch is manufactured from a single blank of material. The connector tubes are formed by bending or rolling a portion of the blank into a generally tubular shape. Bending or folding of the blank forms the hitch such that the hitch is generally U-shaped.

The present application provides other approaches to address the need for a strong and easily operated foldable trailer hitch assembly that can be inexpensively manufactured and assembled.

SUMMARY

Briefly described, the present invention includes a pivotal or foldable hitch assembly for trailers. One embodiment of the pivotal hitch assembly includes a hitch housing mounted to a foreshortened draw bar. The hitch housing is formed by rolling a single piece of material such as heavy gauge steel into a hollow tube having a generally rectangular cross section. The distal end of the draw bar of the trailer also is rectangular in cross section. The proximal end of the hitch housing is of larger breadth than the draw bar of the trailer and is configured so that the distal end of the draw bar can be received within the proximal end of the hitch housing.

The upper wall and lower wall at the proximal end of the tubular hitch housing include two vertically aligned openings. Likewise, the upper and lower walls of the draw bar that is to be extended into the hitch housing have similarly placed openings. The tubular hitch housing is pivotally coupled to the draw bar by mounting the proximal end of the hitch housing about the distal end of the draw bar and aligning the corresponding openings in the hitch housing and the draw bar and inserting a pivot pin through the aligned openings.

To place the pivotal hitch assembly into the operational or towing position, a removable locking pin is inserted into another other set of the corresponding aligned openings so that the hitch housing and draw bar become longitudinally aligned. To place the pivotal hitch assembly in the storage position, the locking pin is removed and the hitch housing is pivoted or folded around the pivot pin.

The hitch housing has a side opening slot that permits free lateral pivoting movement of the hitch housing about the distal end of the draw bar of the trailer. A side opening cuff is inserted between the over lapping ends of the draw bar and hitch housing at the side opening slot and forms a shield against frictional contact between the draw bar and hitch housing. The cuff remains in a stationary position with respect to the draw bar as the overlapping proximal end of the hitch housing pivots about the draw bar and cuff.

The hitch housing also receives the brake actuator for applying the brakes of the trailer in response to the trailer over running the towing vehicle. The larger breadth of the hitch housing accommodates the brake actuator.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is a side view of the pivotal hitch assembly of FIG. 2 in towing position.

FIG. 5 is a front view of the hitch.

FIG. 6 is a perspective view of the pivotal hitch assembly of FIG. 2 in its folded configuration.

DETAILED DESCRIPTION

Figure 1:
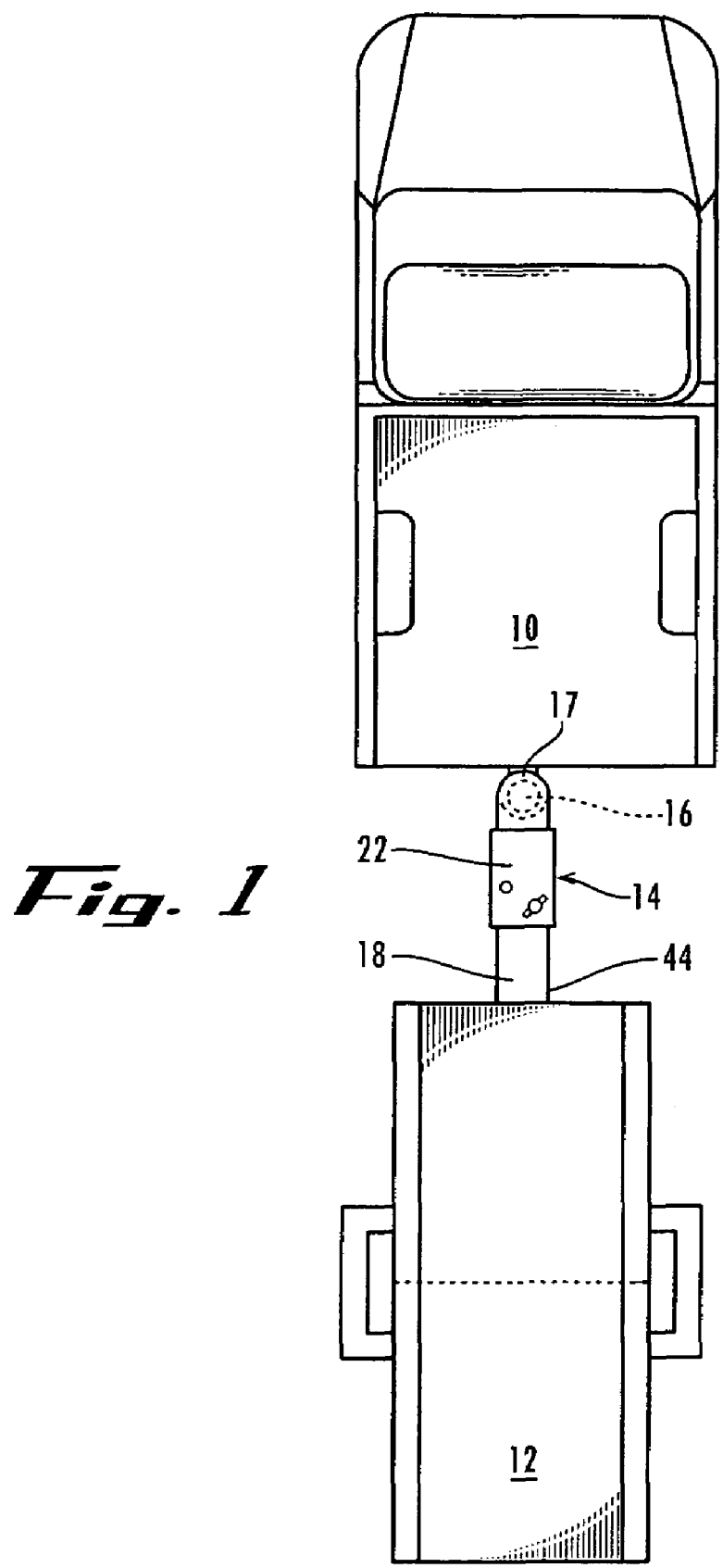
FIG. 1 is a top view of a towing vehicle towing a trailer having the pivotal hitch assembly disclosed herein.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

FIG. 1 shows a towing vehicle 10 that tows a trailer 12 having a pivotal hitch assembly 14. The pivotal hitch assembly 14 includes a hitch housing 22 coupled to the draw bar 18 of trailer 12. The towing vehicle 10 includes a hitchball 16 that couples the trailer 12 to towing vehicle 10 via a ball receiving socket 17. Securing the trailer 12 to the towing vehicle 10 is well known in the art and will not be discussed in further detail.

The pivotal hitch assembly 14 may be configured so that the hitch housing 22 is slidably mounted to a self-actuating brake assembly (not shown in the drawings), as discussed in the Applicant's previously issued U.S. Pat. No. 6,595,540, which is hereby incorporated by reference in its entirety. Further details of a self-actuating brake assembly can be found in Applicant's previously issued U.S. Pat. No. 6,375,211, which is also hereby incorporated by reference in its entirety.

Figure 2:
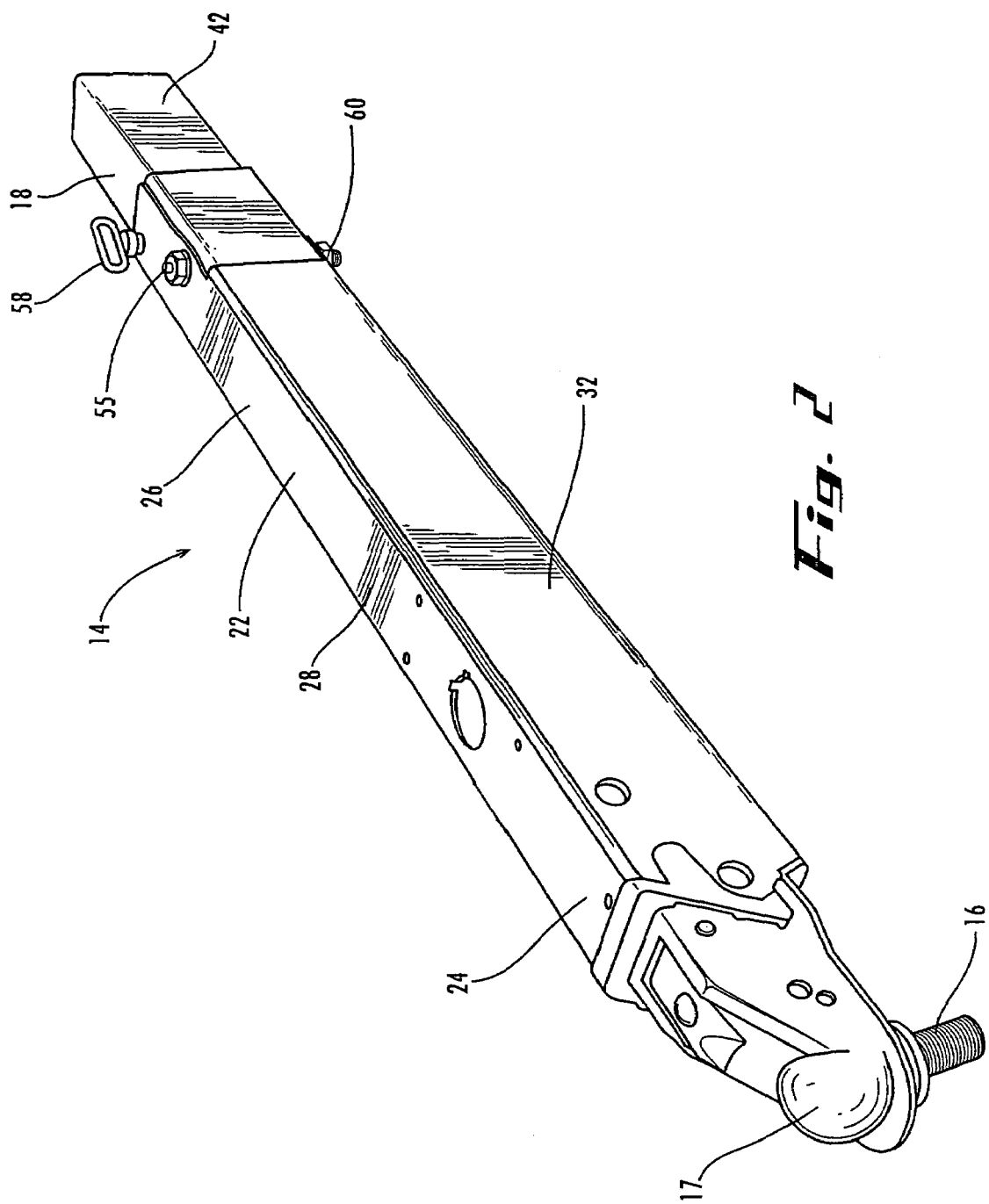
FIG. 2 is a perspective view of an embodiment of the pivotal hitch assembly.
Figure 3:
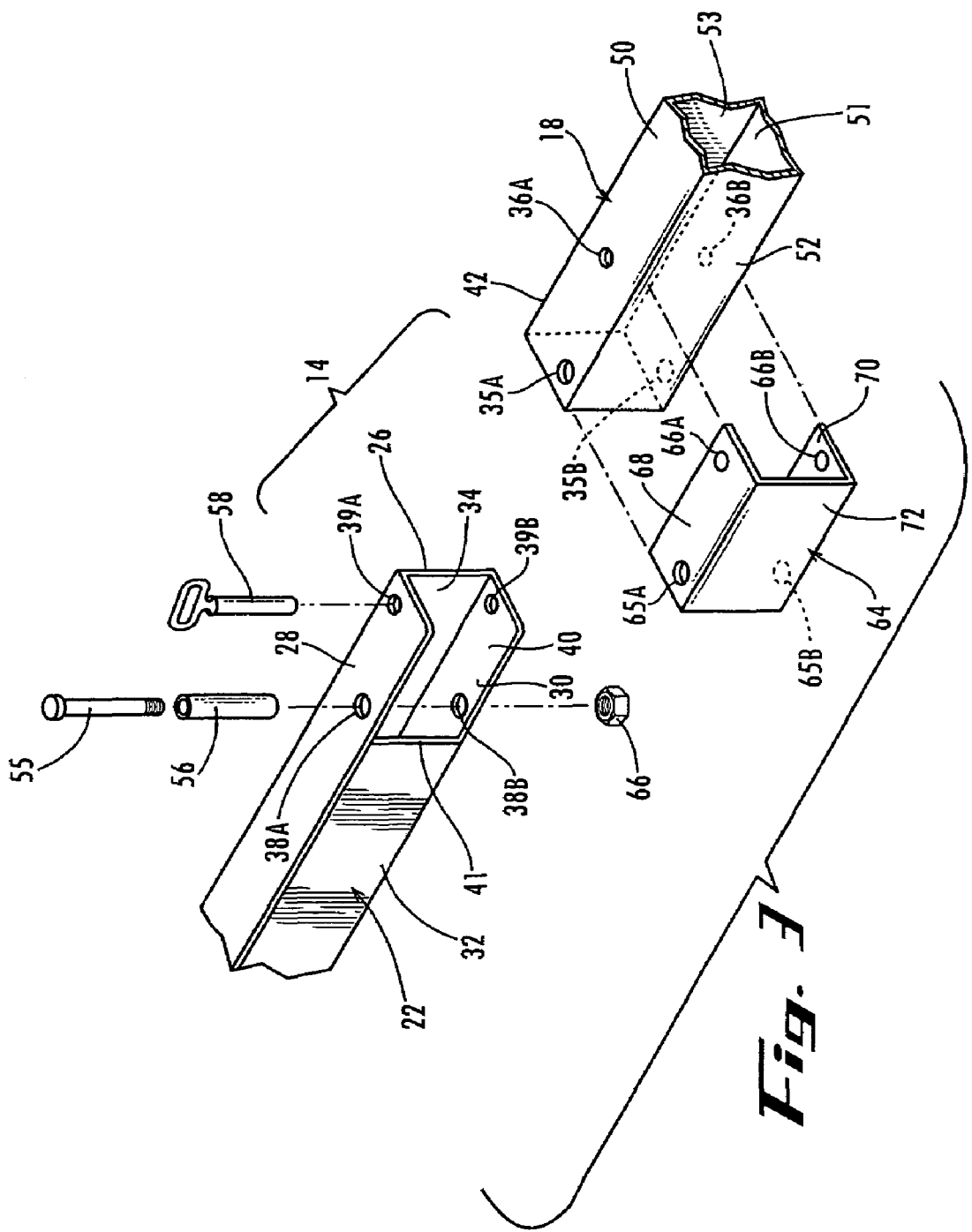
FIG. 3 is a perspective, expanded view of the pivotal hitch assembly.

FIG. 2 shows an embodiment of the pivotal hitch assembly 14. The pivotal hitch assembly 14 includes the hitch housing 22. The hitch housing 22 preferably is formed by rolling a single piece of material such as heavy gauge steel into a hollow rectilinear tube having a generally rectangular cross section. The hitch housing 22 has a front distal end 24 and a rear proximal end 26 and a generally rectangular configuration that includes an upper wall 28 and a lower wall 30, and a pair of opposed sidewalls 32 and 34 extending between the upper wall 28 and the lower wall 30. As shown in FIG. 3, the upper wall 28 and lower wall 30 of the hitch housing 22 each include two pair of aligned openings 38A, 38B, and 39A and 39B located near the proximal end 26 of the hitch housing 22, for coupling the hitch housing 22 to the draw bar or tongue 18 of trailer 12.

As shown in FIG. 3, the upper wall 28, the lower wall 30 and the opposed sidewall 34 of hitch housing 22 are all approximately equal in length and side wall 32 is shorter, having an edge 41 forming a side slot 40 that is open on one side and at the end of the tubular hitch housing 22.

The draw bar 18 may be formed similarly to the hitch housing by rolling a single piece of material such as heavy gauge steel into a hollow tube having a generally rectangular cross section comprising a pair of opposed upper and lower walls 50 and 51, and a pair of opposed side walls 52 and 53 extending between the upper wall and the lower wall. The opposed upper and lower walls 50 and 51, and the opposed side walls 52 and 53 are approximately equal in length. The cross section of the draw bar 18 is smaller than the cross section of the hitch housing 22 and is sized and configured so that distal end of the draw bar 18 may be inserted into the proximal end of the hitch housing 22. The draw bar 18 has a front or distal end 42 adjacent the hitch housing and a rear end 44 extending to the frame of the trailer. The draw bar 18 is rigidly affixed to the trailer 12 by means such as welding.

The pivotal hitch assembly 14 further includes means for pivotally coupling the hitch housing 22 to the draw bar 18 of the trailer. The draw bar 18 has two sets of aligned openings 35A and B, and 36 A and B that correspond in size, shape and placement to and may be aligned with the aligned openings 38A and B and 39A and B in hitch housing 22 for coupling the hitch housing 22 to the draw bar 18. When the distal end of the draw bar 18 is inserted into the proximal end 26 of hitch housing 22, the aligned openings 35A and 35B, and 36A and 36B in the upper wall 28 and lower wall 30 of the draw bar 18 become aligned with the aligned openings 38A, 38B and 39A and 39B of the hitch housing 18, for pivotally coupling the draw bar 18 to the hitch housing 22 using the pivot pin 55 and the locking pin 58 as described hereinafter.

In the operational or towing position, as shown in FIGS. 2 and 5, the pivotal hitch assembly 14 is arranged such that the hitch housing 22 is longitudinally aligned with the draw bar 18. Sleeve 56 is inserted through the aligned holes 38A, 35A, 38B and 35B, through the upper wall 28 of hitch housing 22, through the upper wall 50 of draw bar 18, through the lower wall 30 of draw bar 18 and through the lower wall 51 of hitch housing 22 (e.g., through openings 38A, 35A, 38B and 35B, respectively). The sleeve and the pivot pin 55 extend beyond the bottom of lower wall 30 of hitch housing 22. A retainer such as nut 60 or a cotter pin (not shown) is attached to the protruding end of the pin 55 and bears against the lower end of the sleeve.

When the hitch housing 22 is to be aligned with the draw bar 18 in the operational or towing position, the hitch housing is rotated about the distal end of the draw bar 18 until the openings 39A and B become aligned with openings 36A and B and locking pin 58 is inserted from above into the aligned openings. The locking pin 58 is extended through the upper wall 42 of hitch housing 22, through the upper wall 50 of draw bar 18, through the lower wall 51 of draw bar 18 and through the lower wall 30 of hitch housing 22 (e.g., through openings 36A, 39A, 39B and 36B, respectively).

A U-shaped cuff 64 is sized and shaped to extend about the distal or front end 42 of the draw bar 18. The cuff is three sided and includes top wall 68, bottom wall 70 and side wall 72 that straddle the distal end of draw bar 18. Aligned openings 65A and B are formed in the top wall 68 and bottom wall 70 and openings 66A and B are formed in the top wall and bottom wall of the cuff that are sized, shaped and positioned to be aligned with the openings 35A and B, and 36 A and B of the draw bar 18. The pivot pin 55 and sleeve 56 extend through the openings 65A and 65B of the cuff 64, and the locking pin 58 extends through he openings 66A and B of the cuff. This locks the cuff in position between the draw bar and the hitch housing.

To place the pivotal hitch assembly into its storage position, the locking pin 58 is removed from its operational position and the hitch housing 22 and draw bar and the hitch housing is then pivoted or folded around the pivot pin 55 such that the front or distal end 24 of the hitch housing 22 is folded rearwardly toward a position beside the draw bar 18. The cuff remains in a fixed position with respect to the draw bar, straddling the draw bar. The side slot of the hitch housing moves about the draw bar and cuff as the hitch housing pivots between its folded storage position (FIG. 6) and its aligned operational position (FIGS. 2 and 4).

FIG. 6 illustrates the storage position for the hitch housing.

In addition, the hitch housing 22 can be locked out of the operational or towing position by inserting a lockable pin (not shown) through one set of the corresponding openings 39A, 39B, or 36A, 36B. The corresponding openings in the hitch housing 22 cannot be vertically aligned with the openings in the draw bar 18 through which the pivot pin 55 is locked. In this case, even if a thief were to completely remove the hitch housing 22 from the draw bar 18, a different hitch housing could not be used if the locked pin 69 blocks one set of the openings in the draw bar 18, thereby preventing the draw bar 18 and the hitch housing 22 from being placed into the operational position relative to each other.

Although exemplary embodiments of the present invention have been shown and described, it will be apparent to those of ordinary skill in the art that a number of changes, modifications, or alterations to the invention as described may be made, none of which depart from the spirit of the present invention. All such changes, modifications, and alterations should therefore be seen as within the scope of the present invention.

What is claimed is:

1. A pivotal trailer hitch assembly for connecting a trailer to a towing vehicle, the trailer having a draw bar with a distal end extending forwardly from a trailer frame, said pivotal trailer hitch comprising:
    a tubular hitch housing of greater breadth than the draw bar of the trailer formed from a single piece of material having a proximal end sized and shaped to receive the distal end of the draw bar of the trailer,
    a pivot connector pivotally connecting together the proximal end of said tubular hitch housing and the distal end of said draw bar for the hitch housing to pivot with respect to said draw bar,
    said proximal end of the tubular hitch housing having a side opening slot adjacent the distal end of said draw bar sized and shaped to pass the distal end of the draw bar as the tubular hitch housing pivots with respect to the draw bar,
    a U-shaped cuff positioned in said side opening slot and having side walls positioned between said hitch housing and said draw bar, and
    a locking pin for locking said distal end of the draw bar to said proximal end of said tubular hitch housing.

2. The pivotal trailer hitch assembly of claim 1, wherein said pivot connector passes through said cuff.

3. The pivotal trailer hitch assembly of claim 1, wherein said pivot connector comprises aligned openings in said hitch housing and in said draw bar, and a pivot pin extending through said aligned openings.

4. The pivotal trailer hitch of claim 3, and further including a sleeve surrounding said pivot pin.

5. The pivotal trailer hitch assembly of claim 1, wherein said locking pin comprises
    a locking pin extending through aligned openings of said hitch housing and said draw bar.

6. A pivotal trailer hitch assembly for connecting a trailer to a towing vehicle, the trailer having a draw bar with a distal end extending forwardly from a trailer frame, said pivotal trailer hitch comprising:
    a tubular hitch housing of greater breadth than the draw bar of the trailer having a proximal end sized and shaped to receive the distal end of the draw bar of the trailer,
    a pivot connector pivotally connecting together the proximal end of said tubular hitch housing and the distal end of said draw bar for the hitch housing to pivot with respect to said draw bar,
    said proximal end of the tubular hitch housing having a side opening slot adjacent the distal end of said draw bar sized and shaped to pass the distal end of the draw bar as the tubular hitch housing pivots with respect to the draw bar,
    a locking pin for locking said distal end of the draw bar to said proximal end of said tubular hitch housing,
    the proximal end of said hitch housing is U-shaped in cross section with a side opening slot, with the proximal end of the hitch housing straddling the distal end of the draw bar, and
    a U-shaped cuff interposed between the hitch housing and the draw bar and having a side wall exposed through said side opening of the proximal end of said hitch housing.

7. The pivotal trailer hitch of claim 6, and wherein said pivot connector comprises a pivot pin extending through said hitch housing, said cuff, and said draw bar.

8. A pivotal trailer hitch assembly comprising:
    a tubular hitch housing of generally rectangular cross sectional configuration,
    said tubular hitch housing having a U-shaped proximal end with an upper wall and a lower wall and a side wall extending from said upper wall and said lower wall and a side opening slot opposed said side wall
    first aligned openings in each of the upper wall and the lower wall of the hitch housing for pivotally coupling the hitch housing to a draw bar of a trailer;
    second aligned openings in each of the upper wall and the lower wall of the hitch housing for aligning the hitch housing with respect to the draw bar of the trailer, and
    a U-shaped cuff interposed between the hitch housing and the draw bar and having a side wall exposed through said side opening of the proximal end of said hitch housing.

9. The pivotal hitch assembly of claim 8, further comprising:
    a pivot pin inserted through the first aligned opening in each of the upper wall and the lower wall of the hitch housing and through the draw bar of the trailer.

10. The pivotal hitch assembly of claim 9, further comprising:
 a removable locking pin inserted through the second aligned opening in each of the upper wall and the lower wall of the hitch housing and through the draw bar of the trailer.

11. The pivotal hitch assembly of claim 10, further comprising a sleeve surrounding said removable locking pin.

12. The pivotal hitch assembly of claim 8, wherein the upper wall, the lower wall, and the first side wall of said tubular hitch housing are all approximately equal in length.

13. The pivotal hitch assembly of claim 8, wherein the upper wall, the lower wall, and the first opposed sidewall of said tubular hitch housing are all approximately equal in length, and the second opposed sidewall is shorter in length than the upper wall, the lower wall and the first opposed side wall, forming a side opening slot.

14. The pivotal hitch assembly of claim 8, wherein the front end of the hitch housing has a socket for receiving a hitch ball.

\* \* \* \* \*